United States Patent [19]

Maruyama

[11] Patent Number: 5,252,903
[45] Date of Patent: Oct. 12, 1993

[54] MOTOR CONTROL CIRCUIT FOR AUTOFOCUS UNIT

[75] Inventor: Shigehisa Maruyama, Saitama, Japan

[73] Assignee: Sony Corporation, Japan

[21] Appl. No.: 681,733

[22] Filed: Apr. 8, 1991

[30] Foreign Application Priority Data

Apr. 13, 1990 [JP] Japan .................................. 2-98592

[51] Int. Cl.$^5$ ............................................... H02P 8/00
[52] U.S. Cl. ..................... 318/696; 318/685;
   318/626; 318/627; 318/686
[58] Field of Search ............... 318/696, 685, 626, 627,
   318/686; 358/227

[56] References Cited

U.S. PATENT DOCUMENTS

| | | | |
|---|---|---|---|
| 4,087,732 | 5/1978 | Pritchard | 318/696 |
| 4,429,968 | 2/1984 | Taka et al. | 354/403 |
| 4,612,588 | 9/1986 | Tsukahara | 318/685 X |
| 4,634,949 | 1/1987 | Golladay | 318/696 |
| 4,652,806 | 3/1987 | Aiello | 318/696 |
| 4,842,387 | 6/1989 | Murakami et al. | 358/227 X |
| 4,920,420 | 4/1990 | Sano et al. | 358/227 |

OTHER PUBLICATIONS

Patent Abstracts of Japan, vol. 15, No. 139, Apr. 1991.
Patent Abstracts of Japan, vol. 6, No. 200, Oct. 9, 1982.

*Primary Examiner*—William M. Shoop, Jr.
*Assistant Examiner*—Karen Masih
*Attorney, Agent, or Firm*—Ronald P. Kananen

[57] ABSTRACT

A motor control circuit for an autofocus unit which microsteps a stepping motor to turn a rotor and drive a focus lens, which circuit has a memory which stores data on current values of a plurality of phases at rotation-stopping positions of the rotor, a drive circuit which energizes the phases based on the current data output by the memory, and an address generator which reads out the current data of the memory, the address generator generating an address which makes an inclination of a path of a rotational angle with respect to a time axis smoother at a switching point of direction of rotation of the rotor, whereby the wobbling of the focus lens becomes gentler and the vibration and audio noise can be reduced.

7 Claims, 7 Drawing Sheets

FIG.1

*(PRIOR ART)*

FIG. 2

*(PRIOR ART)*

FIG. 3

*(PRIOR ART)*

MOTOR CONTROL CIRCUIT FOR AUTOFOCUS UNIT

DESCRIPTION OF THE INVENTION

1. Field of Utilization in Industry

The present invention relates to a motor control circuit which controls the rotation of a stepping motor in an autofocus unit which performs focusing by causing a focus lens to reciprocate linearly by rotation of the stepping motor.

2. Description of the Related Art

In recent years, the mainstream in sharp focus detection systems for autofocus units of video cameras has become the "mountain climbing system" where the peak of the high pass component of a video signal is detected. This "mountain climbing" system moves the focus lens in the direction of the greater high pass component of the video signal while causing the focus lens to reciprocate slightly or moving the focus lens linearly to near the peak and then causing the focus lens to reciprocate slightly or moving the focus lens linearly to near the peak and then causing the focus lens to move to the peak position (see, for example, the Japanese Patent Application No. 1-157554). A stepping motor is used for the drive of the focus lens due to the ease of control.

Figure 1:
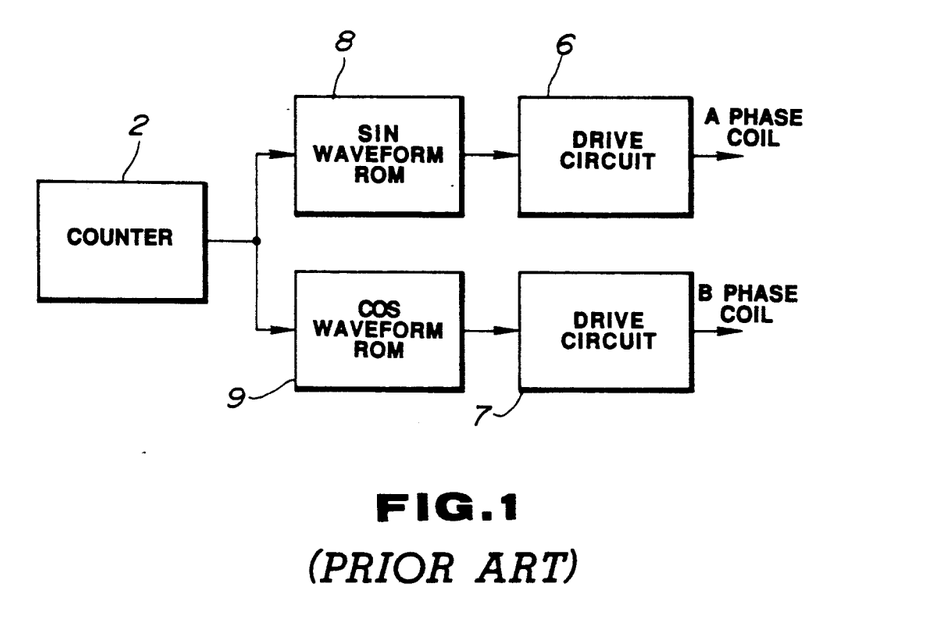
FIG. 1 is a block diagram of a conventional motor control circuit.
Figure 2:
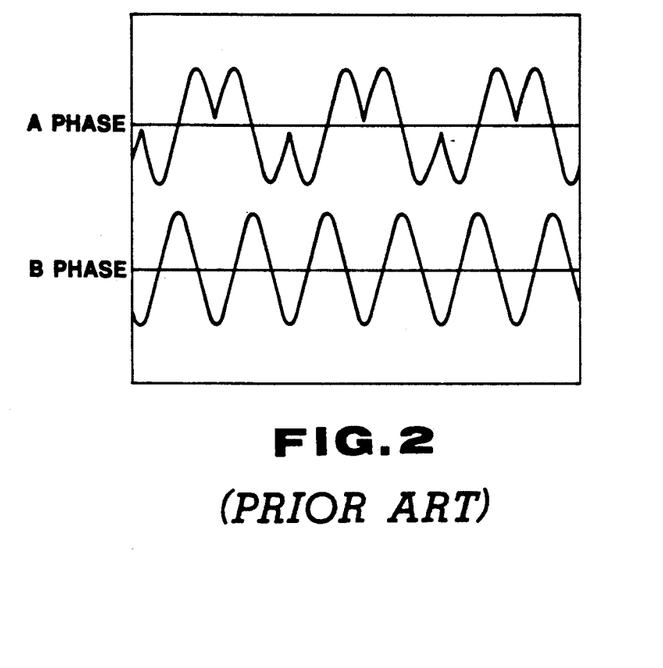
FIG. 2 is a diagram of the drive waveform at the time of reciprocation.
Figure 8A:
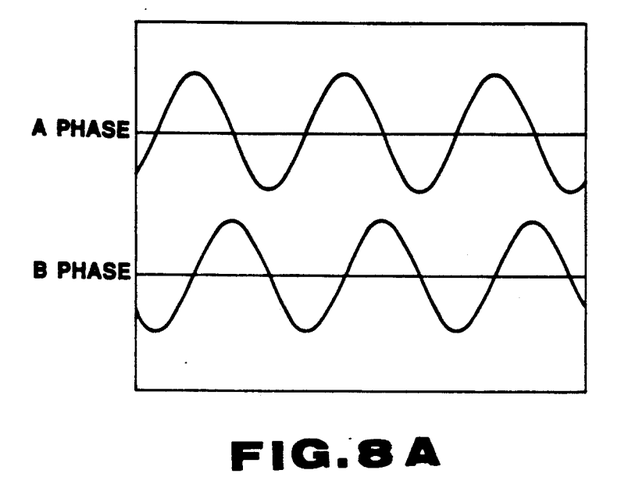
FIG. 8A is a diagram of the drive waveform at the time of linear movement.
Figure 8B:
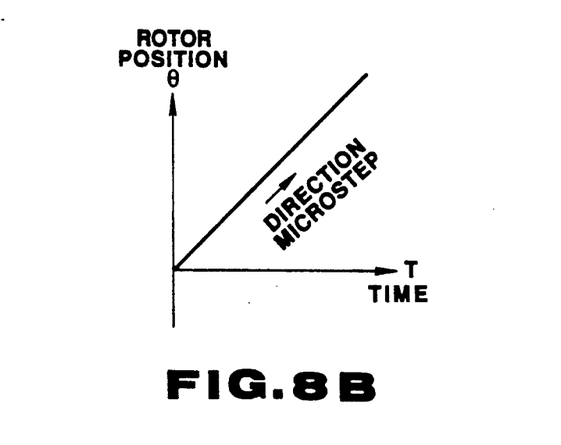
FIG. 8B is a graph of the rotor rotational angle at the time of linear movement.

However, a stepping motor suffers from greater vibration compared with a DC motor. To reduce the vibration, it has been considered to use a microstepping circuit. This microstepping circuit, as shown in FIG. 1, has a counter 2, a SIN waveform ROM 8, and a COS waveform ROM 9 which each use the count of the counter 2 as a read signal. Based on the data of the ROM's 8 and 9, the coils of the A phase and B phase are energized through drive circuits 6 and 7 respectively. When moving the focus lens in one direction, the drive current shown in FIG. 8A is passed to the A phase and the B phase and the rotor turned as shown in FIG. 8B for rotation in one direction in a smooth manner with low vibration. When causing the focus lens to wobble, it is generally considered desirable to pass a drive current combining rotation in the forward and reverse directions as shown in FIG. 2 to the A phase and B phase, whereupon the rotor turns in the forward and reverse directions as shown in FIG. 3.

Figure 3:
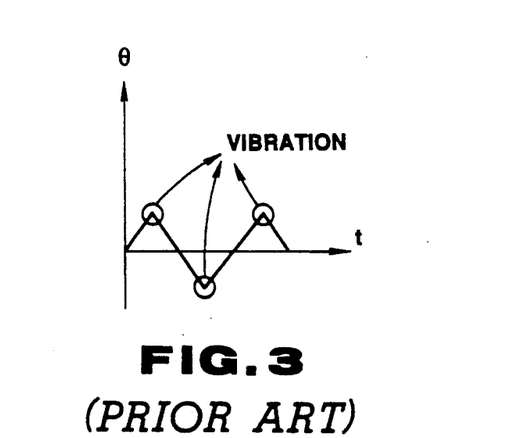
FIG. 3 is a graph of the rotor rotational angle at the time of the reciprocation.

However, the switchover in directions of rotation of the rotor with respect to the time axis is sharp as shown in FIG. 3, so a large vibration occurs at the point of switching for wobbling or a large audio noise is generated.

SUMMARY OF THE INVENTION

Therefore, the present invention has as its object the provision of a motor control circuit for an autofocus unit using a stepping motor for driving the focus lens which can cause a smooth linear reciprocation of the focus lens and can reduce the vibration and audio noise.

The motor control circuit for an autofocus unit according to present invention for achieving the above object is a circuit for an autofocus unit which has a stepping motor, which turns a rotor by passing a current of a SIN waveform to coils of a plurality of phases of the stepping motor and forms microsteps, and which displaces a focus lens in accordance with the turning of the rotor. The circuit comprises a memory which stores data on current values to the coils of the plurality of phases a rotation-stopping positions of the rotor; a drive circuit which energizes the coils of the phases based on the current data output by the memory; and an address generator which generates an address for reading out the current data of the memory, the address generator generating an address which makes an inclination of a path of a rotation angle with respect to a time axis smoother at a switching point for a change in the direction of rotation of the rotor.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

The gist of the invention is as follows: In the reciprocating mode, an address generator sends to a memory an address which makes the inclination of the path of rotational angle gentler at the point of switching of rotational directions of the rotor and current data corresponding to this condition is read out from the memory to drive the motor, so the focus lens reciprocates so that the displacement with respect to the time axis becomes, for example, a sine wave.

Below, an embodiment of the present invention will be explained using the drawings.

Figure 4:
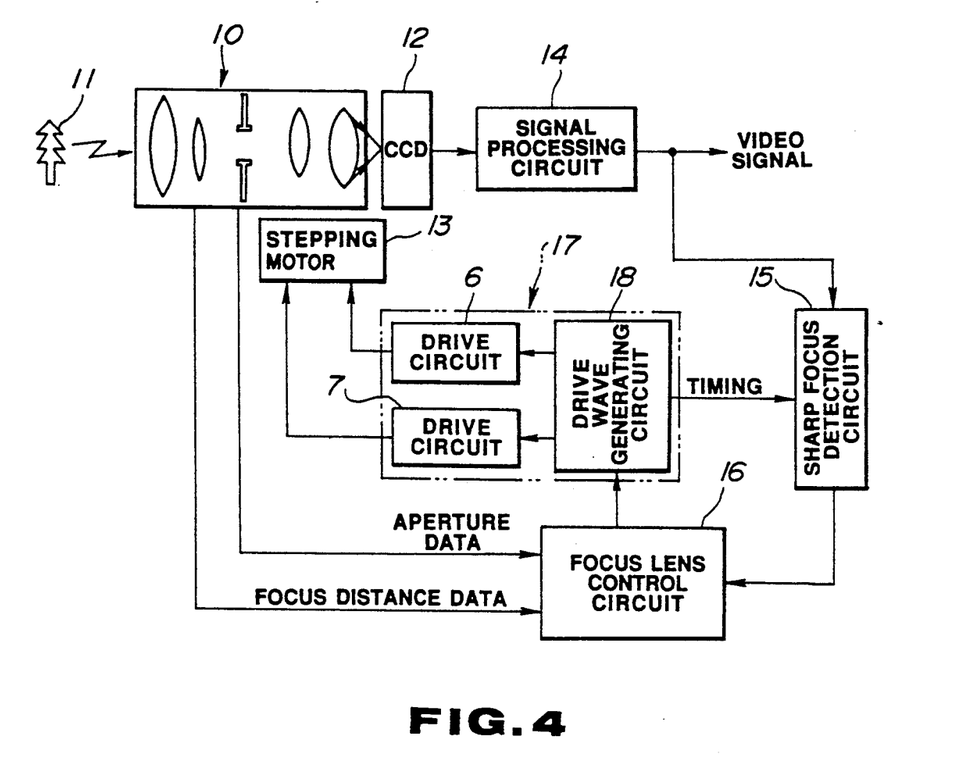
FIG. 4 is a block diagram of an autofocus unit.
Figure 5:
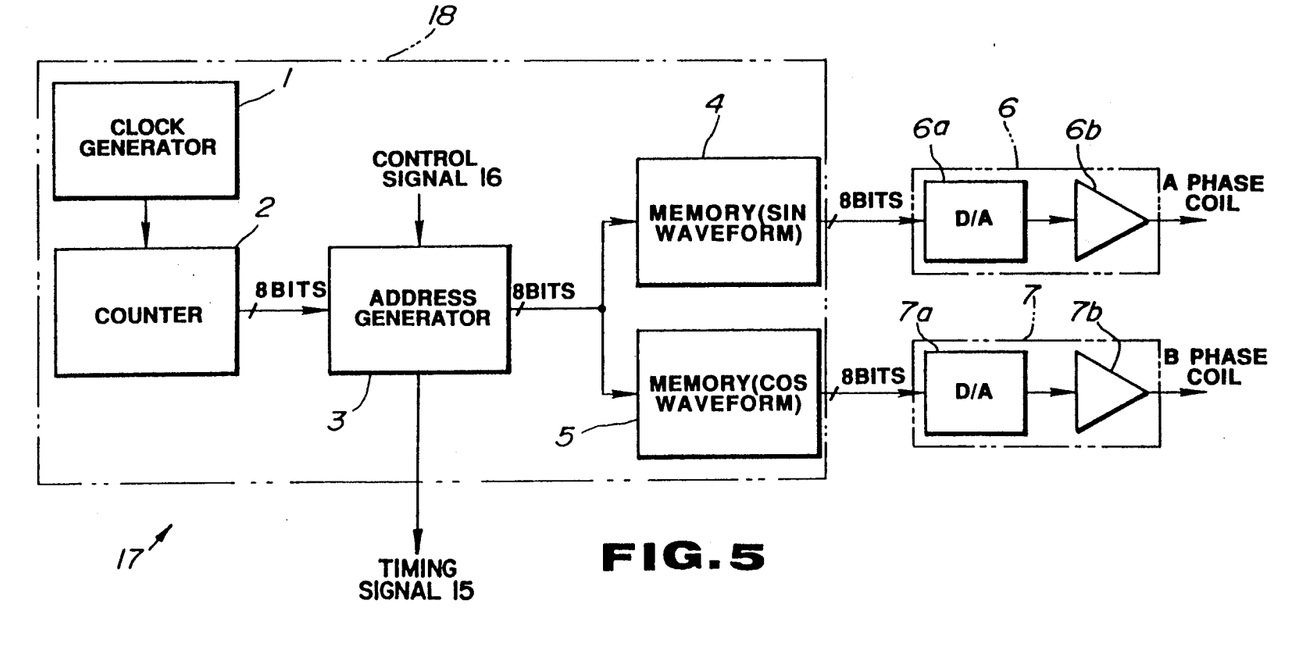
FIG. 5 is a block diagram of a motor control circuit according to the present invention.

FIG. 4 and FIG. 5 show an embodiment of the present invention.

FIG. 4 is a block diagram of an autofocus unit. In FIG. 5, an optical processing unit 10 is provided with a zoom lens, a focus lens, an iris, and so forth. The image of an object 11 is formed at a solid state picture element (CCD) 12. The zoom lens and focus lens generally are comprised of a plurality of lens elements. The position of the zoom lens is changed by a zoom lens drive means (not shown), while the position of the focus lens is changed by the driving force of a stepping motor 13.

The output video signal of the solid stat picture element 12 is subjected to a certain processing by a signal processing circuit 14, and the processed video signal is led to a sharp focus detection circuit 15. The sharp focus detection circuit 15 has a high pass filter and detects the high pass component of the video signal. Further, the sharp focus detection circuit 15 detects the direction of movement of the focus lens with respect to the sharp focus position based on a timing signal of drive waveform generating circuit 18 mentioned below.

Specifically, the drive waveform generating circuit 18 outputs a timing signal at a predetermined phase timing at the time of lens reciprocation. The circuit 18 makes use of the fact that the phase of the high pass component level of the video signal with respect to the amplitude of reciprocation of the focus lens differs before the sharp focusing and after the sharp focusing so as to detect the direction of movement.

A focus lens control circuit receives high pass component level data of the sharp focus detection circuit 15 and movement direction data of the focus lens and receives its aperture data and focal distance data from the optical processing unit 10. The focus lens control circuit 16 outputs a control signal to the motor control circuit 17 so that the high pass component level of the video signal peaks. Further, the aperture data and the focal distance data are used for controlling the amplitude of lens reciprocation in accordance with the depth of the picture field. The motor control circuit 17 is comprised of a drive waveform generating circuit 18 and drive circuits 6 and 7 of the A phase coil and the B phase coil of the stepping motor 13. A block diagram of the motor control circuit 17 is shown in FIG. 5.

In FIG. 5, the drive waveform generating circuit 18 has a clock generator 1, the output of the clock generator 1 being led to a counter 2. The counter 2 counts up the clock and outputs an 8-bit count value (0 to 255) to an address generator 3. The address generator 3 is comprised of a ROM which has stored in the A block of 000 to 0FF addresses the address data of the characteristic curve shown in FIG. 6A, the B block of 100 to 1FF addresses which include that shown in FIG. 6B, and the C block of 200 to 2FF addresses which are shown in FIG. 6C. As mentioned below, the rotational angle displacement of the focus lens with respect to the time axis, which is the same as the characteristic curves, is obtained with the address generator 3 generating an address by commanding a sine wave with a gentle inclination of the path of rotational angle with respect to the o time axis at the point of switching of the direction of rotation of the rotor. Which of the A, B, and C blocks the address data is output is selected by a control signal, with the address data of the address generator 3 being output to two memories 4 and 5. The memory 4 has current data giving a SIN waveform when the address data value is successively counted up (i.e., the case shown in FIG. 6A), while the memory 5 has current data giving a COS waveform when it is counted up. The outputs of the memories 4 and 5 are respectively led to the drive circuits 6 and 7. The drive circuits 6 and 7 have D/A converters 6a and 7a and amplifiers 6b and 7b, with the outputs of the drive circuits 6 and 7 being respectively supplied to the A phase coil and B phase coil of the stepping motor 13.

The focus lens is comprised so as to be movable in the axial direction of the light by the driving force of the stepping motor 13, and correspondence is established between the rotational angle of the rotor of the stepping motor 13 and the amount of movement of the focus lens.

Below, an explanation will be made of the operation of the above structure.

When the focus lens is moved linearly, the B block is selected by the control signal in the circuit 18 of FIG. 4. When the B block is selected, the address generator 3 outputs the data shown in FIG. 6B to the memories 4 and 5 according to the count of the counter 2. When this done, the memories 4 and 5 use the 10 data of the address generator 3 as a read signal and output current data based on the same. The drive current shown in FIG. 8A is passed to the coils according to the current data, and the rotor turns as shown in FIG. 8B to move the focus lens linearly in one direction.

When causing the focus lens to reciprocate, the A block is selected by the control signal 16. When the A block is selected, the address generator 3 outputs the data shown in FIG. 6A to the memories 4 and 5, the drive current shown in FIG. 7A is passed to the coils, and the rotor turns as shown in FIG. 7B to cause the focus lens to reciprocate. The wobbling forms a SIN waveform with respect to the time axis and the inversion movement of the focus lens becomes smooth, so the vibration is small and similarly the audio noise is small.

When linearly moving the focus lens while causing it to reciprocate, the C block is selected by the control signal. When the C block is selected, the address generator 3 outputs the data shown in FIG. 6C and the focus lens moves in one direction while reciprocating. The wobbling at that time also forms a SIN waveform, so the vibration is low and the audio noise is low.

Figure 6A:
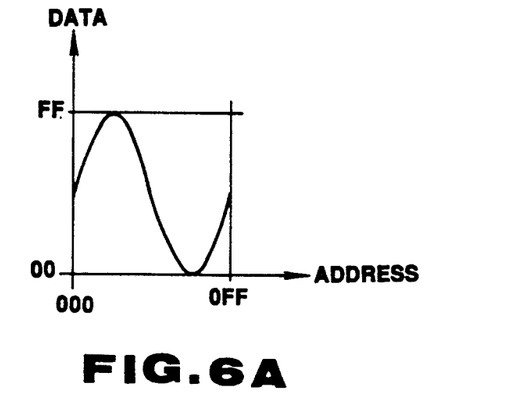
FIGS. 6A to 6C are views showing the content of data of the blocks of the address generating unit.
Figure 6B:
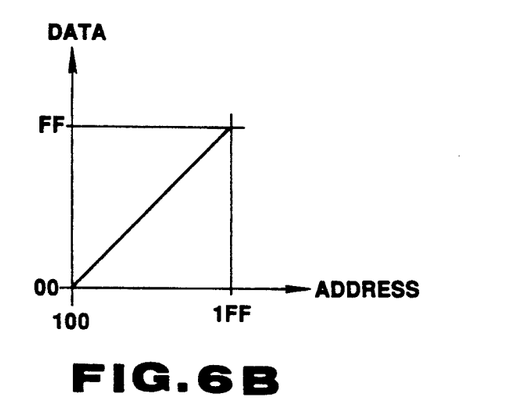
Figure 6C:
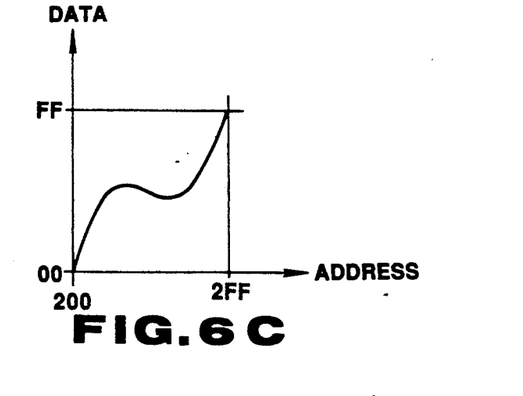
Figure 7A:
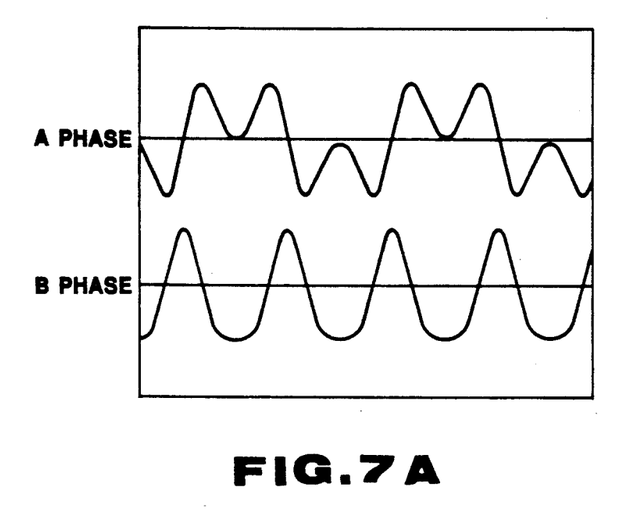
FIG. 7A is a diagram of the drive waveform at the time of reciprocation.
Figure 7B:
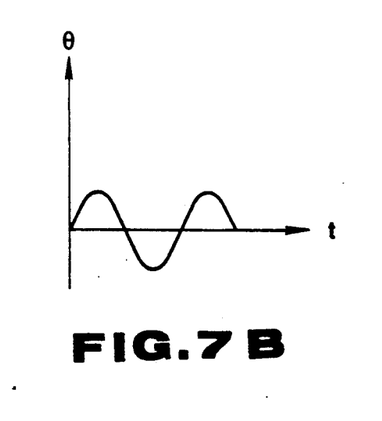
FIG. 7B is a graph of the rotor rotational angle at the time of reciprocation.

Further, in the embodiment, only three types of operations, shown in FIGS. 6A to 6C, could be selected, but other various types of operations are possible by modifying or adding to the content of the data of the address generator 3.

As explained above, the present invention provides a motor control circuit for an autofocus unit which microsteps a stepping motor to turn a rotor and drive a focus lens. The circuit has a memory which stores data on current values of a plurality of phases at rotation stopping positions of the rotor; a drive circuit which energizes the phases based on the current data output by the memory; and an address generator which reads out the current data of the memory, the address generator generating an address which makes an inclination of a path of a rotational angle with respect to a time axis smoother at a switching point of direction of rotation of the rotor, whereby the reciprocation of the focus lens becomes gentler and the vibration and audio noise can be reduced.

I claim:

1. A motor control circuit for an autofocus unit which has a stepping motor which turns a rotor by passing as alternating current to coils of a plurality of phases of the stepping motor thus to operate said motor in a micro-stepping mode, and which displaces a focus lens in accordance with the turning of the rotor, said motor control circuit for said autofocus unit comprising:

a memory which stores data on current values to the coils of the plurality of phases at rotation-stopping positions of the rotor;

a drive circuit which energizes the coils of the phases based on the current value data output by the memory; and an address generator which generates an address for reading out the current value data of the memory, the address generator generating an address which with said memory and said drive circuit defines means for making an inclination of a path of a rotational angle with respect to a time axis smooth and continuous at a switching point of direction of rotation of the rotor.

2. An autofocus unit as set forth in claim 1, wherein displacement of the rotational angle of the abovementioned rotor as a function of the time axis takes the form of a sine waveform.

3. A motor control circuit for an autofocus unit, comprising:
   a focus lens;
   a rotor for displacing said focus lens in accordance with rotation of said rotor;
   a stepping motor having coils of a plurality of phases for turning said rotor; and
   means for passing an alternating current to said coils of said plurality of phases, including a memory which stores data relating to current values provided to the coils of the plurality of phases at rotation-stopping positions of the rotor; a drive circuit which energizes the coils of the phases based on current data output from the memory; and an address generator which generates an address for reading out the current data of the memory, the address generator generating an address which smooths an inclination of a path of a rotational angle with respect to a time axis at a switching point of the direction of rotation of the rotor, said current values include current data for moving said focus lens linearly, current data for causing the focus lens to reciprocate wherein the inversion movement of the focus lens is smooth, the vibration is small, and audio noise is small; and current values for linearly moving the focus lens while causing the focus lens to reciprocate.

4. The autofocus unit as set forth in claim 3 wherein said reciprocation is caused by a sine waveform with respect to the time axis.

5. The autofocus unit as set forth in claim 3 further including control means for controlling which address data is output from the address generator.

6. The autofocus unit as set forth in claim 3 further including a counter driven by a clock generator, said counter outputting a signal to said address generator, a first portion of said memory providing a sine waveform to said stepping motor when said address data is successively counted up, another portion of the memory providing a COS waveform when counted up.

7. A motor control circuit for an autofocus unit, comprising:
   a stepping motor which turns a rotor by passing an alternating current to coils of a plurality of phases of the stepping motor to operate in a microstepping mode, thus to displace a focus lens in accordance with movement of said rotor;
   a first drive circuit for a first phase coil of said stepping motor, and a second drive circuit for a second phase coil of said stepping motor;
   a memory having a first memory portion for providing a predetermined waveform to said first drive circuit and a second predetermined waveform to said second drive circuit;
   an address generator generating a address for commanding said memory to provide either or both of said predetermined waveforms to first and second drive circuits;
   a counter for outputting a count value to said address generator; and
   means for controlling which address data is output by said address generator, said address data including data which cause the focus lens to reciprocate by forming a sine waveform with respect to a time axis so that inversion movement of the focus lens becomes smooth, data which cause said focus lens to move linearly, and data which cause said focus lens to move linearly while also reciprocating according to said sine waveform.

* * * * *